US008379735B2

(12) United States Patent
Lee et al.

(10) Patent No.: US 8,379,735 B2
(45) Date of Patent: Feb. 19, 2013

(54) AUTOMATIC VIDEO GLITCH DETECTION AND AUDIO-VIDEO SYNCHRONIZATION ASSESSMENT

(75) Inventors: Mingtzong Lee, Woodinville, WA (US); Huseyin S. Yildiz, Kenmore, WA (US)

(73) Assignee: Microsoft Corporation, Redmond, WA (US)

( * ) Notice: Subject to any disclaimer, the term of this patent is extended or adjusted under 35 U.S.C. 154(b) by 1460 days.

(21) Appl. No.: 11/383,444

(22) Filed: May 15, 2006

(65) Prior Publication Data

US 2008/0037954 A1     Feb. 14, 2008

(51) Int. Cl.
*H04N 7/12* (2006.01)
*H04N 9/475* (2006.01)

(52) U.S. Cl. .................................. 375/240.28; 348/512

(58) Field of Classification Search ............. 375/240.28; 348/512
See application file for complete search history.

(56) References Cited

U.S. PATENT DOCUMENTS

| 4,329,719 | A | 5/1982 | Ninomiya |
|---|---|---|---|
| 4,777,539 | A | 10/1988 | Nomura et al. |
| 5,430,485 | A | 7/1995 | Lankford et al. |
| 5,594,660 | A | 1/1997 | Sung et al. |
| 6,297,845 | B1 | 10/2001 | Kuhn et al. |
| 6,542,198 | B1 * | 4/2003 | Hung et al. .................... 348/459 |
| 6,810,152 | B2 | 10/2004 | Endo et al. |
| 7,366,754 | B2 * | 4/2008 | Wetzel et al. ................. 709/203 |
| 2003/0138051 | A1 * | 7/2003 | Chen et al. ............... 375/240.26 |
| 2004/0128514 | A1 * | 7/2004 | Rhoads .......................... 713/176 |
| 2004/0212734 | A1 | 10/2004 | MacInnis et al. |
| 2005/0063027 | A1 * | 3/2005 | Durst et al. ......................... 359/2 |
| 2006/0047624 | A1 | 3/2006 | Ando et al. |
| 2006/0083301 | A1 * | 4/2006 | Nishio ..................... 375/240.08 |

OTHER PUBLICATIONS

Rainer Leinhart et al. "Universal Synchronization Scheme for Distributed Audio-Video Capture on Heterogeneous Computing Platforms", Proceedings of the eleventh ACM international conference on Multimedia, published in 2003.
Paul Barham et al. "Wide Area Audio Synchronization", University of Cambridge Computer Laboratory, Nov. 1995.
Distributed Immersive Performance. DIP version 1: the first proposal. Retrieved from the Internet on Mar. 8, 2006 http://imsc.usc.edu/dip/systeml.html.

* cited by examiner

*Primary Examiner* — Jay Au Patel
*Assistant Examiner* — Richard Torrente
(74) *Attorney, Agent, or Firm* — Lee & Hayes, PLLC

(57) ABSTRACT

A process to detect video glitches and audio-video synchronization errors arising during playback or capture. The process encodes an external time stamp into video and audio streams directly at the output of a digital media playback device. The process captures the stamped video and audio streams and analyzes the external stamp by comparing it with a presentation time stamp and a capture time stamp.

20 Claims, 8 Drawing Sheets

---
345 Capture Audio and Video

| RECEIVE VIDEO FRAME | 410 | RECEIVE AUDIO SAMPLE | 425 |

---
255 Audio/Video Synchronization Calculation Method

DETERMINE SOFTWARE VIDEO TIMESTAMP 1, SOFTWARE VIDEO TIMESTAMP 2, HARDWARE VIDEO TIMECODE — 415

DETERMINE SOFTWARE AUDIO TIMESTAMP 1, HARDWARE AUDIO TIMECODE — 427

CREATE FRAME INDEX IN VIDEO FRAME DATA ARRAY AND ADD DATA — 420

CREATE AUDIO INDEX IN AUDIO DATA ARRAY AND ADD DATA — 430

CALCULATE INITIAL AUDIO OFFSET USING SOFTWARE AUDIO TIMESTAMP 1 AND HARDWARE AUDIO TIMECODE — 435

FIND ENTRY IN VIDEO FRAME DATA ARRAY WITH HARDWARE VIDEO TIMECODE = HARDWARE AUDIO TIMECODE — 440

CONVERT VIDEO TIMESTAMP 1 AND AUDIO TIMESTAMP 1 TO TIME BASED UNIT, CALCULATE TIME DIFFERENCE — 445

SUBTRACT INITIAL AUDIO OFFSET FROM TIME DIFFERENCE TO DETERMINE ABSOLUTE SYNCHRONIZATION OFFSET — 450

---
ANALYZE VIDEO TIMING — 355

AUTOMATIC VIDEO GLITCH DETECTION AND AUDIO-VIDEO SYNCHRONIZATION ASSESSMENT

BACKGROUND

In rendering digital content of video and audio, a video glitch or discontinuity may occur that detracts from the video or audio quality. As digital media continues to become more prevalent and as digital capture and playback systems become more complex there may be a need to accurately and scientifically detect and correct glitches in digital video and audio. In general purpose operating systems, streaming processes may run concurrently with other processes, and, as a result, media sample processing and flow may be indeterminate and burst-like. For example, jittering glitches may occur.

Video glitch detection may be performed by a person "eyeballing" video output on a monitor or television to watch for glitches and poor audio-video synchronization. Video glitch detection may also be performed by internal software logging. Such human observation of video glitches and audio-video synchronization may be time-consuming, inaccurate, and may not be quantitative. Similarly, internal software logging may be inaccurate as the software may not have a way to observe the audio and video signals directly at each output.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a Personal Computer (PC) system, the system described is provided as an example and not a limitation. As those skilled in the art will appreciate, the present examples are suitable for application in a variety of different types of systems including Personal Digital Assistants (PDAs), portable telephones, virtualizations or emulations of PCs, and the like.

This description relates generally to an automated system and method for detecting video glitches. Video glitches may occur during both playback and capture of a video stream. A video glitch may occur during playback of the video and audio streams because of a lost or dropped video or audio sample. In another example, a video glitch may occur during playback because an audio or video sample may have been received at the incorrect time or for the wrong duration. A video glitch may also occur during capture of the video and audio streams because of lost or dropped audio or video samples. In another example, a video glitch may occur during capture of the audio and video streams because the audio or video samples were received with the wrong time stamp or the wrong duration stamp assigned at a capture device.

Video glitches may be manifested by dropping, tearing, repeating, lip synchronization problems, and other errors associated with sample presentation timelines. For example, frame tearing may occur when information from two separate video frames is displayed simultaneously. In addition, the refresh rate of a display device such as a television or computer monitor may not match the refresh rate of a particular media source. As a result, an original frame may need to be displayed for multiple refresh cycles in non-integer multiples. This may cause various video glitches during playback of digital video.

Figure 1:
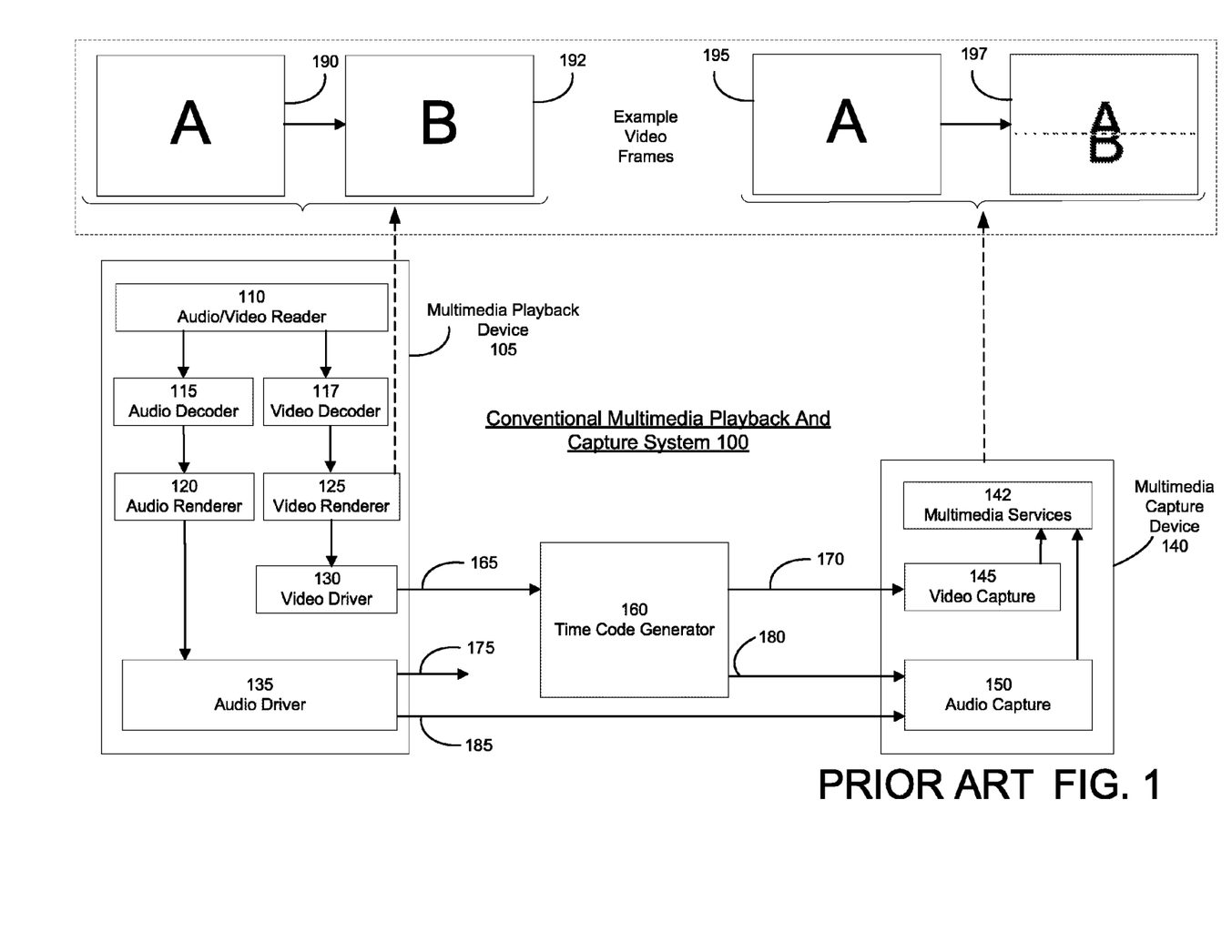
FIG. 1 is a block diagram showing a conventional multimedia playback and capture system.

Video glitches may be due to large segments of hardware, such as the PCI (Peripheral Component Interconnect) or AGP (Accelerated Graphics Port) bus that may exist between the multimedia playback software and the eventual video output. Such large segments of hardware may also act to prevent accurate glitch detection. The following figure describes how video glitches may occur. The following figure further describes a system including a multimedia playback device which may produce a video glitch and a multimedia capture device which may detect the video glitch.

FIG. 1 is a block diagram showing a conventional multimedia playback and capture system 100. The conventional multimedia playback and capture system 100 may include a conventional multimedia playback device 105, a conventional time code generator 160, and a conventional multimedia capture device 140 for producing conventional video frames 190, 192, 195, and 197.

The conventional audio/video reader 110 may be coupled to a conventional audio decoder 115 and a conventional video decoder 117. The conventional audio decoder 115 may be coupled to a conventional audio renderer 120 and the conventional video decoder 117 may be coupled to a conventional video renderer 125. The conventional video renderer 125 may be coupled to a conventional video driver 130. The conventional audio renderer 120 may be coupled to a conventional audio driver 135.

The conventional multimedia playback device 105 may be any device capable of reading multimedia content and rendering multimedia content so it may be viewed on a display device such as a computer monitor with speakers or a conventional television set. For example, the conventional multimedia playback device 105 may be a DVD player, a portable telephone device, a personal digital assistant (PDA), a standalone set top box, a conventionally constructed Personal Computer (PC) including a conventional central processor unit (CPU), random access memory (RAM), read only memory (ROM), a conventional operating system (OS), or the like.

The conventional audio/video reader 110, conventional audio decoder 115, conventional video decoder 117, conventional audio renderer 120, conventional video renderer 125, conventional video driver 130, and conventional audio driver 135 may be typically constructed software components capable of executing on the multimedia playback device 105. The multimedia playback device 105 may further provide software services to allow for communication of data, information, instructions, or the like between each of the above mentioned elements and other typical software components which may be further included in the conventional operating system.

The conventional multimedia playback device 105 may include typical hardware components such as, at least, a hardware card and monitor for viewing visual information, one or more human interface devices (HID) such as a keyboard, mouse, audio speakers, or the like. The conventional operating system (OS) which may be executed by the conventional multimedia playback device 105 may execute services to send and receive information to such typical hardware components.

The conventional multimedia playback device 105 may further execute software services which may allow the execution of conventional software applications. An example of such software execution services may be a typical component object model (COM) service, a typical dynamic runtime service such as the Microsoft .Net Runtime® or a java Virtual Machine®, or the like.

A conventional video stream 165 from the conventional video driver 130 may be coupled to the conventional time code generator 160. The conventional time code generator 160 may be coupled to a conventional analog video stream including conventional time codes 170. Further, the conventional time code generator 160 may be coupled to a conventional first channel audio stream including conventional time codes 180. The conventional audio driver 135 may be coupled to a conventional first channel audio stream 175 and a conventional second channel audio stream 185. The conventional first channel audio stream 175 and conventional second channel audio stream 185 may represent the left and right audio channels or the like.

The conventional multimedia capture device 140 may be any device capable of capturing and converting a video stream and a corresponding audio stream into a digital format. For example, the conventional multimedia playback device 105 may be a recordable DVD player, a portable telephone device, a personal digital assistant (PDA), a standalone set top box, a conventionally constructed Personal Computer (PC) including a conventional central processor unit (CPU), random access memory (RAM), read only memory (ROM), and a conventional operation system (OS), or the like.

The conventional multimedia capture device 140 may include a conventional operating system, conventional software execution environment, and/or conventional hardware components as discussed earlier in the description of the conventional multimedia playback device 105. Further, the conventional multimedia capture device 140 may include a conventional audio capture device 150 and a conventional video capture device 145.

The conventional audio capture device 150 may be a typical audio digitizing hardware bus card or the like and any associated typical software components required for functioning of the conventional audio capture device 150. The conventional audio capture device 150 may receive an analog audio signal which may include any number of separate audio channels. For example, the analog audio signal may include two stereo channels, six surround sound channels, or the like. Once the audio capture device 150 has received the analog audio signal, the conventional audio capture device 150 may perform a conventional analog waveform to binary data conversion. Such a conventional analog waveform to binary data conversion may be performed by any conventional analog to digital conversion method. In an alternative example, the conventional audio capture device 150 may receive a binary audio signal and may perform a conversion from one form of binary data to another form of binary data.

The conventional video capture device 145 may be a typical video digitizing hardware bus card or the like and any associated typical software components required for functioning of the conventional video capture device 145. The conventional video capture device 145 may receive a conventional analog video signal encoded in conventional video encoding standards such as the National Television Systems Committee (NTSC) format, the Phase Alternating Line (PAL) format, or the like. Once the conventional video capture device 145 has received the analog video signal, the conventional video capture device 145 may perform a conventional analog video to digital video conversion. Such a conventional analog video to digital video conversion may be performed by any conventional analog video to digital video conversion method. In an alternative example, the conventional video capture device 145 may receive a binary video signal such and may perform a conversion from one form of binary data to another form of binary data.

The conventional video capture device 145 and the conventional audio capture device 150 may each be coupled to a conventional multimedia services component 142. For example, such a multimedia services component 142 may be a typical software component, assembly, library, or the like which when executed performs a service. In another example, the multimedia services component 142 may include a combination of several software components, or the like. More particularly, the multimedia services component 142 may provide a variety of services for the video capture device 145 and the audio capture device 150 including video display, audio playback, data storage, and the like.

Therefore, the conventional second channel audio stream 185 may be coupled to the conventional audio capture device 150. In addition, the conventional first channel audio stream including conventional time codes 180 may also be coupled to the conventional audio capture device 150. The conventional analog video stream including conventional time codes 170 may be coupled to the conventional video capture device 145. The conventional video capture device 145 and the conventional audio capture device 150 may be coupled to the conventional multimedia services component 142.

In order for the conventional multimedia capture device 140 to receive audio and video to test the conventional multimedia playback device 105 for video glitches, the conventional multimedia playback device 105 must first render the multimedia file. Typically, a multimedia file including video and audio may be stored as compressed binary data within conventional data storage which may be included in the conventional multimedia playback device 105. For example, the multimedia file may be compressed using a Motion Picture Experts Group (MPEG) standard compression algorithm. In addition, the audio and video portions may be stored in a multiplexed data arrangement.

The conventional audio/video reader 110 may then read the stored binary data corresponding to the video frames and corresponding audio, and then separate, or demultiplex, the video frames and corresponding audio into demultiplexed binary video and audio. The conventional audio/video reader 110 may then pass the demultiplexed binary audio data to a conventional audio decoder 115. The conventional audio/video reader 110 may also pass the demultiplexed binary video data to the conventional video decoder 117. The conventional audio decoder 115 may then decompress and/or decode the binary data to produce a stream of decompressed and/or decoded audio. The conventional audio decoder 115 may pass the decompressed and/or decoded audio information to the conventional audio driver 135. In addition, the conventional video decoder 117 may then decompress and/or decode the binary data to produce a stream of decompressed and/or decoded video. The conventional video decoder 117 audio decoder 115 may pass the decompressed and/or decoded video information to the conventional video driver 130.

The conventional audio driver 135 may then control the typical audio hardware that may be included in the conventional multimedia playback device 105 such that the decompressed and/or decoded audio information may be converted to a conventional second channel audio stream 185, which may be the right channel analog audio, and a conventional first channel audio stream 175, which may be the left channel analog audio. Further, the conventional video driver 130 may also control the typical video display hardware that may be included in the conventional multimedia playback device 105 such that the decompressed and/or decoded video information may be converted to a conventional video stream 165.

Video glitches may be introduced at this point of multimedia file processing by the conventional multimedia playback device 105. In order to illustrate a video glitch may be produced by the conventional multimedia playback device 105 and how a video glitch may be received at the conventional multimedia capture device 140, example video frames will now be discussed.

More particularly, an example multimedia file may include the conventional video frame 190 and the conventional video frame 192. Such frames may have corresponding audio, for example, a human voice may speak the letter "A" during display of the conventional video frame 190, and a human voice may speak the letter "B" during display of the conventional video frame 192. The effect of the playback of such video frames and audio may be the display of the capital letter "A" while the letter "A" is spoken, followed by display of the capital letter "B" while the letter "B" is spoken.

However, as can be seen from the diagram illustrating the conventional multimedia playback device 105, the conventional video driver 130 and the conventional audio driver 135 are interposed between the conventional audio renderer 120 and the conventional video renderer 125. Further, there may be other drivers similar to the conventional audio driver 135 and the conventional video driver 130 that may be competing for system resources on the conventional multimedia playback device 105. The result of such resource competition may be that the conventional video driver 130 and the conventional audio driver 135 may convert data to an analog form at differing rates causing typical video glitchs. In addition, the conventional video driver 130 and/or conventional audio driver 135 may become starved for system resources and may not be able to process data continuously, also causing typical video glitches.

There may be an unlimited number of types of typical video glitches; however, example typical video glitches may be audio/video synchronization errors, video frame jitter errors, dropped video frames, video frame display duration errors, and video frame tearing errors. Such typical video glitches may be manifested to a viewer of the multimedia file in a variety of ways.

For example, audio/video synchronization errors may be caused because the analog audio is played at a different time than the video frame it may be expected to correspond with. A viewer of a video with audio/video synchronization errors may perceive the effect of an audio/video synchronization error as hearing analog audio at a time either earlier or later than the visual movement included in the video frames. Dropped video frames may be caused because some of the frames of video are not displayed at all. A viewer of a video with dropped video frames may perceive the effect as a jump or skip of the visual movement included in the video frames.

Video frame jitter errors may be caused by the rendering of video frames in the incorrect order. A viewer of a video with video frame jitter errors may perceive the effect as a jump, skip, or a looping of the visual movement included in the video frames. Video frame display duration errors may be caused when a video frame is displayed for a longer duration than the video frame was designated to be displayed. A viewer of a video with video frame display duration errors may perceive the effect as degradation or lessening of the smoothness or uninterrupted flow of the video frames.

Video frame tearing errors may be caused when the display of a video frame is not aligned or synchronized with the refresh cycles of a display device such a television or computer monitor. A viewer of a video with a video frame tearing error may perceive the effect as a display of a combination of a portion of a first video and a portion of a subsequent video frame simultaneously. For example, conventional video frame 197 may display a video tearing error, as it may be combination of the top half of original conventional video frame 190 and the bottom half of conventional video frame 192.

Such typical video glitches may result in an unfavorable viewing experience for a viewer of the video. As discussed earlier, In order to correct such video glitches, such typical video glitches must first be detected. Typically, such typical video glitches are detected by human observation, or "eyeballing" the conventional video stream 165 while listening to the conventional first channel audio stream 175 and the conventional second channel audio stream 185. Such "eyeballing" may not be quantitative as a human being may not be capable of accurately detecting small timing variances included in a typical video glitch.

A conventional time code generator 160 may be used to insert a time code, or encoded portion of data representing a presentation time to the conventional analog video stream including conventional time codes 170 and the conventional first channel audio stream including conventional time codes 180. Such time codes may be a Society of Motion Picture Television Engineers (SMPTE) time code. Such time codes may then be analyzed to determine if the time code corresponding to a frame of video was played back at the same time as the time code corresponding to an audio signal.

However, such a time code generator 160 may only add time codes representing the time audio and video are received at the conventional time code generator 160 and not at the point the audio and video were initially rendered, for example, by the conventional audio renderer 120 and the conventional video renderer 125. Therefore, the conventional analog video stream including conventional time codes 170, conventional first channel audio stream including conventional time codes 180, and conventional second channel audio stream 185 received at the conventional multimedia capture device 140 may be analyzed. However, such a system may not scientifically and quantitatively detect typical video glitches at the time and location a viewer of the audio and video would notice such typical video glitches.

A system and method for scientifically and quantitatively detecting typical video glitches at the time and location where end users see and hear may be useful.

Figure 2:
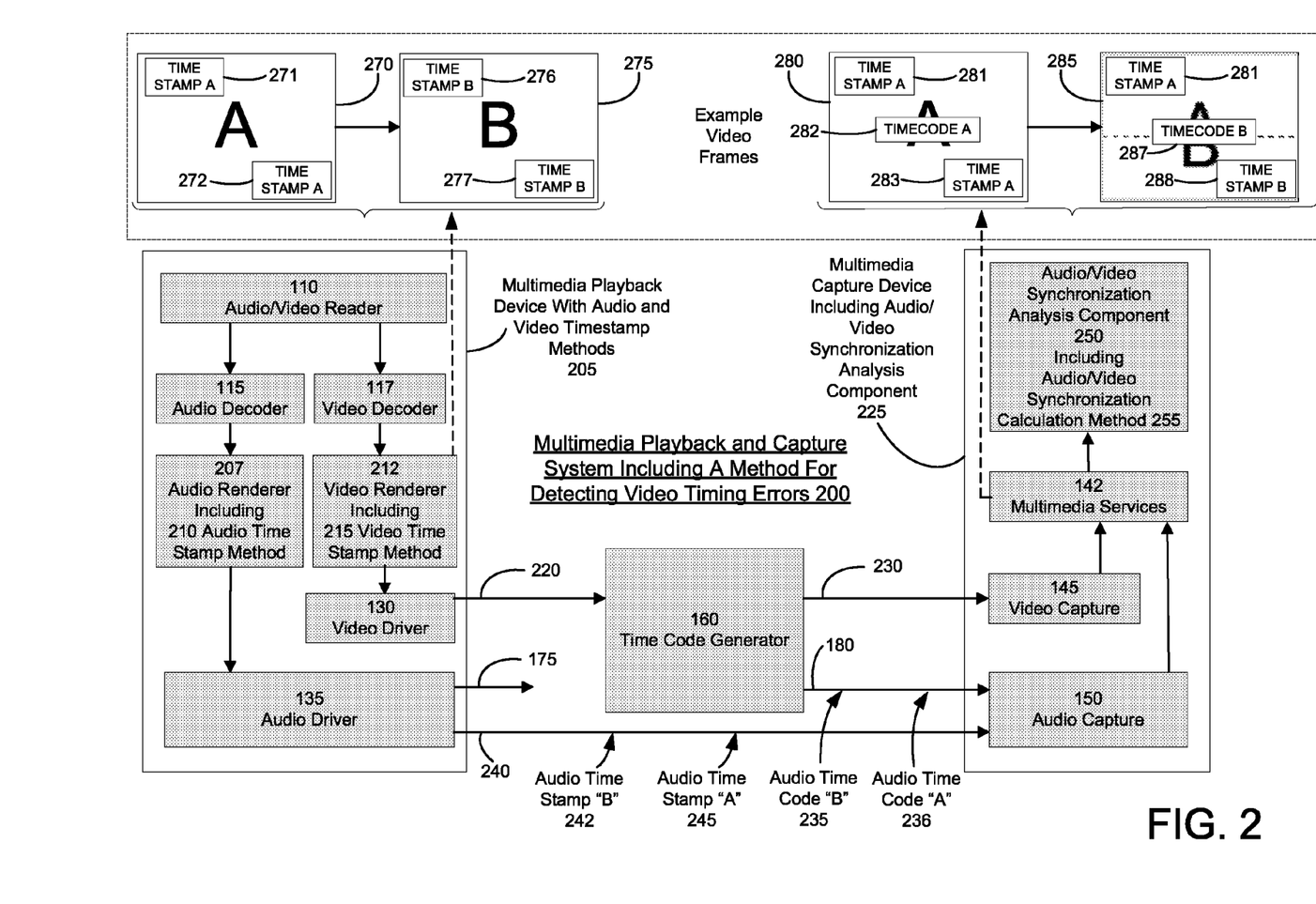
FIG. 2 is a block diagram showing an example of a multimedia playback and capture system including a method for detecting video glitches.

FIG. 2 is a block diagram showing an example of a multimedia playback and capture system including a method for detecting video glitches 200. The system may include a multimedia playback device with audio and video timestamp methods 205 and a multimedia capture device including an audio/video synchronization analysis component 225. The system may be used to generate exemplary video frames 270, 275, 280, and 285. Elements having like numbering from FIG. 1 function similarly and their function need not be described again.

The system shown may be capable of detecting a video glitch as previously discussed. Such a system may implement an audio time stamp method 210, a video time stamp method 215, and an audio/video synchronization analysis component 250. The method implemented by the system may use analysis of the generated time stamps to determine if a video glitch has occurred.

An audio renderer 207 may incorporate an audio time stamp method 210. A video renderer 212 may incorporate a video time stamp method 215. The audio time stamp method 210 may act in concert with the video time stamp method 215 to produce time stamps which may be inserted into the second channel audio stream including time stamp 240 and the video stream including time stamp 220. Alternatively, the stamps may be inserted in a first channel or a video stream.

In an alternative example, the audio time stamp method 210 and video time stamp method 215 may not be used to produce and insert audio and video stamps, respectively. In such an example, the audio and video times stamps may be have been added to the audio and video in the original multimedia file by another system. That is, the audio and video read by the audio/video reader 110 may include audio and video time stamps, and therefore, the audio time stamp method 210 and video time stamp method 215 may not insert audio and video time stamps.

The audio time stamp method 210 and video time stamp method 215 may be provided in a number of equivalent architectures. They may be a method within a class, a standalone software component, a precompiled script, or the like. While the audio time stamp method 210 is shown as being incorporated with the audio renderer 207, the audio time stamp method 210 may be implemented in a separate software module, assembly, library, or the like that may be coupled to the audio renderer 207. Similarly, the video time stamp method 215 is shown as being incorporated with the video renderer 212, however, the video time stamp method 215 may be implemented in a separate software module, assembly, library, or the like that may be coupled to the video renderer 212.

The multimedia capture device including an audio/video synchronization analysis component 225 may further include an audio/video synchronization analysis component 250 including an audio/video synchronization calculation method 255. The audio/video synchronization analysis component 250 may be a software component, a class within a software component, a precompiled script, or the like. The audio/video synchronization calculation method 255 may be a method within a class, a standalone software component, a precompiled script, or the like. While the audio/video synchronization calculation method 255 is shown as being incorporated into the audio/video synchronization analysis component 250, the audio/video synchronization calculation method 255 may be implemented in a separate module, assembly, library, or the like that may be coupled to the audio/video synchronization analysis component 250.

The audio time stamp method 210 may encode a time stamp in any manner and may insert the time stamp into the audio stream rendered by the audio renderer 207. Similarly, the video time stamp method 215 may encode a time in any manner and may insert the time stamp into the video frames rendered by the video renderer 212.

For example, the audio time stamp method 210 may use a biphase encoding of an audio level square wave. More particularly, the audio time stamp method 210 may construct the time code to be any number of bits of information and may convert the time code into a square wave signal. A maximum amplitude of the square wave of a predetermined duration may represent a bit with a value of 1. A minimum amplitude of the square wave of a predetermined duration may represent a bit with a value of 0. The period of the square wave may represent the length of the binary data. For example, if the period of the square wave is 4 milliseconds and each individual datum within the square has a period of one millisecond, the length of the binary data is 4 bits. The square wave may then be injected into the selected audio channel.

For example, the video time stamp method 215 may encode a time stamp in any manner and may add the time stamp or multiple copies of the time stamp on each frame of rendered video. For example, the video time stamp method 215 may construct the time stamp to be any number of bits of information and may convert the time stamp into a bar code. In alternative example, the video time stamp method 215 may simply add a bitmap or other graphical representation of the numerical time stamp to each frame of rendered video. In another alternative example, the video time stamp method 215 may add both a bar code representing the time code and a graphical representation of the numerical time code to each frame of the rendered video.

The multimedia playback device with audio and video timestamp methods 205 may include an audio/video reader 110, an audio decoder 115, an video decoder 117, an audio renderer 207 including a audio time stamp method 210, a video renderer 212 including a video time stamp method 215, a video driver 130, and an audio driver 135. These parts will be discussed in further detail below.

The audio/video reader 110 may be coupled to an audio decoder 115. The audio decoder 115 may be coupled to an audio renderer 207 including a audio time stamp method 210. The audio decoder 115 may also be coupled to a video renderer 212 including a video time stamp method 215. The video renderer 212 may be coupled to a video driver 130. The audio renderer 207 including an audio time stamp method 210 may also be coupled to an audio driver 135.

The video driver 130 may be coupled to the conventionally constructed time code generator 160. The conventionally constructed time code generator 160 may be coupled to the video capture device 145 by the video stream including time stamps and time codes 230. The time code generator 160 may also be coupled to the audio capture device 150 by the first channel audio stream including conventional time codes 180.

The multimedia capture device including an audio/video synchronization analysis component 225 may include an audio/video synchronization analysis component 250 including an audio/video synchronization calculation method 255, a multimedia services component 142, a video capture device 145 and an audio capture device 150.

The audio capture device 150 may be coupled to the first channel audio stream including conventional time codes 180 and the second channel audio stream including time stamp 240. The audio capture device 150 may also be coupled to a multimedia services component 142. The video capture device 145 may be coupled to a multimedia services component 142. The multimedia services component 142 may be coupled to the audio/video synchronization analysis component 250 that may include the audio/video synchronization calculation method 255.

The audio driver 135 may generate the first channel audio stream 175 which may correspond to the right audio signal. The audio driver 135 may generate the second channel audio stream including time stamp 240 which may correspond to the left audio signal.

As discussed previously, the time code generator 160 may also insert a time code on each of the audio and video streams. As such, the time code generator 160 may be coupled to the video stream including time stamp 220. Note that because the multimedia capture device 140 is simply testing the output of the multimedia playback device 105, the multimedia capture device 140 may not need to place a time code into the actual audio stream produced by the video driver 130. Therefore, the time code generator 160 may not be coupled to the first channel audio stream 175 and instead only be coupled to the first channel audio stream including conventional time codes 180. Further, the time code generator 160 may be coupled to the video stream including time stamps and time codes 230.

Therefore, the video renderer 125 may use the video time stamp method 215 and the video driver 130 to produce the video stream including time stamp 220. An example of the video frames produced by the video renderer 125 and video time stamp method 215 which may be included in the video stream including time stamp 220 may be the video frame 270 and 275. Further, the video frame 270 may include the top left time stamp A 271 and the bottom right time stamp A 272. Further, the video frame 275 may include the top left time stamp B 276 and the bottom right time stamp B 277.

In addition, the audio corresponding to the video frame 270 may include the audio time stamp "A", 245. The audio corresponding to the video frame 275 may include the audio time stamp "B", 242. As discussed previously, the first channel audio stream including conventional time codes 180 may include a time code as inserted by the time code generator 160. The audio signal corresponding to the video frame 270 may include the audio time code "A" 236 and the audio signal corresponding to the video frame 275 may include the audio time code "B" 235.

Therefore, when the video frame 270 is received by the video capture device 145, the video capture device 145 may capture the video frame 270 such that the video frame 280 is produced. Similarly, when the video frame 275 is received by the video capture device 145, the video capture device 145 may capture the video frame 275 such that the video frame 285 is produced. The video frame 280 may include the time stamp A 281 and the time stamp A 283 as added by the video time stamp method 215 and the time code A 282 as added by the time code generator 160. The video frame 285 may include the time stamp A 281 and the time stamp B 288 also as added by the video time stamp method 215 and the time code B 287 as added by the time code generator 160.

Note that the video frame 285 may represent a video frame with a video glitch as shown by the example image which may be a combination of the image in the video frame 270 and the image in the video frame 275. For example, the top half of the letter "A" and the bottom half of the letter "B". Such a video glitch may be known as a torn frame. Such a torn frame may be due to a late arrival of video frame 285 after the arrival and rendering of video frame 280. The detection of such a video glitch will be explained.

Once each of the video frame 280, the video frame 285, the video stream including time stamps and time codes 230, the first channel audio stream including conventional time codes 180, and the second channel audio stream including time stamp 240 are captured by the multimedia capture device 140, the audio/video synchronization analysis component 250 may discover the value of the time stamp A from each of the audio and video streams. The audio/video synchronization analysis component 250 may further discover the value of the time code A from each of the audio and video streams.

The audio/video synchronization analysis component 250 may use any method to discover the time code and the time stamp included in each of the video and audio streams. For example, the audio/video synchronization analysis component 250 may receive each video frame that was digitized by the video capture device 145 and then perform optical character recognition on the predetermined searchable areas of each video frame. The audio/video synchronization analysis component 250 may further decode a bar code according to a predetermined method or may simply record the numerals recognized by the optical character recognition method. Further, the audio/video synchronization analysis component 250 may receive an audio frame, or portion of the audio stream of a predetermined time period, and then convert a square wave to a corresponding pattern of bits representing time stamps which may locate the time for any audio bit.

Once the audio/video synchronization analysis component 250 has discovered the value of the time stamp and the time code in each of the audio and video streams, the audio/video synchronization analysis component 250 may perform the audio/video synchronization calculation method 255.

Figure 3:
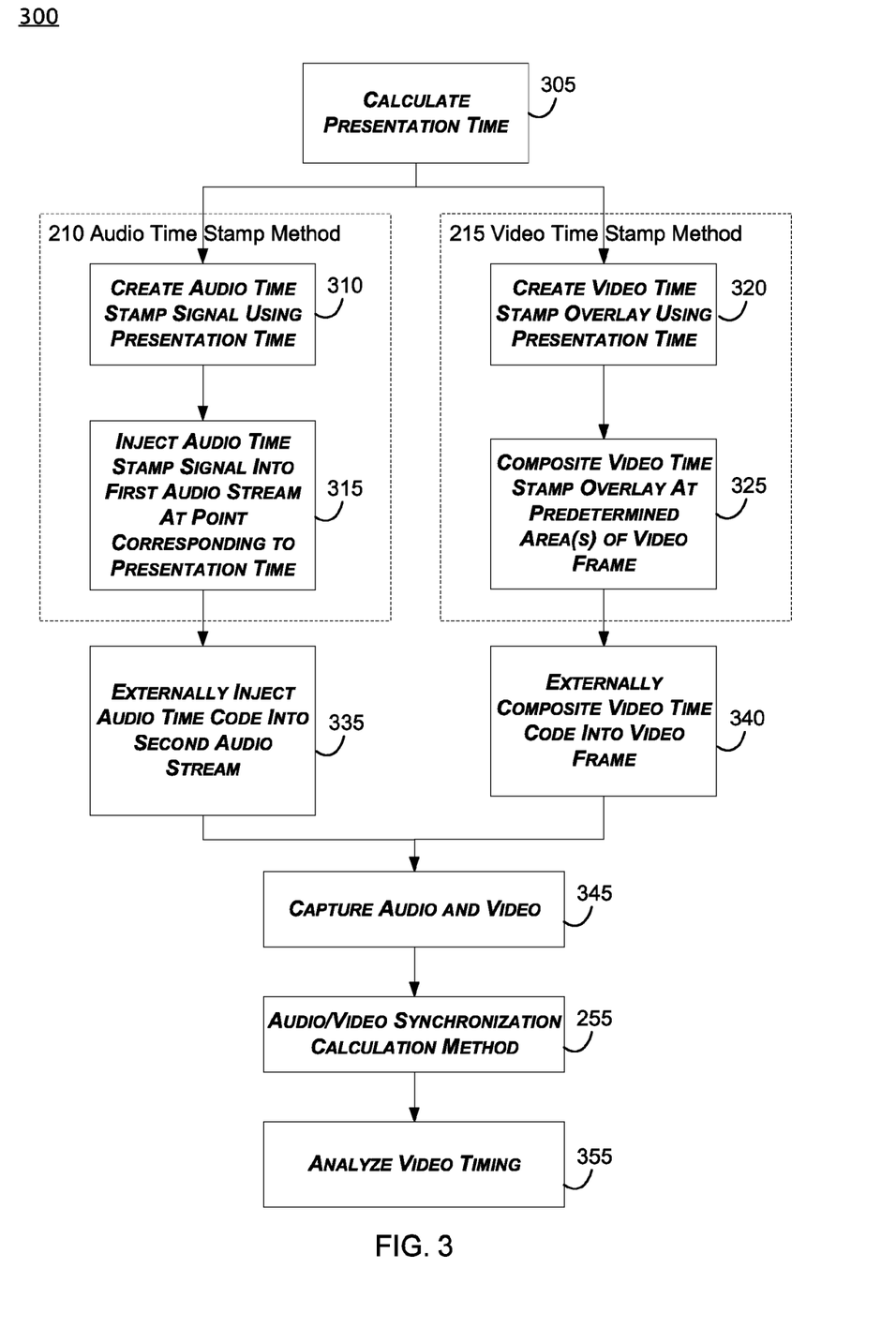
FIG. 3 is a flow diagram showing an example method for detecting a video glitch.

FIG. 3 is a flow diagram showing an example method 300 for detecting a video glitch.

Block 305 may refer to an operation in which the sequential presentation time of a video frame and a corresponding audio sample is calculated. Such a calculation may be performed using any suitable method and the presentation time may be formatted in any manner. For example, a first video frame may have a presentation time value of "1", a second video frame may have a presentation time of "2", a third video frame may have a presentation time of "3", and so on. A first audio sample corresponding to the first video frame may similarly have a presentation time of "1", a second audio sample corresponding to the second video frame may also similarly have a presentation time of "2", and so on.

In an alternative example, a first video frame may have a presentation time of "33.3 millisecond", a second video frame may have a presentation time of "66.6 milliseconds", a third video frame may have a presentation time of "99.9 milliseconds", and so on. A first audio sample corresponding to the first video frame may similarly have a presentation time of "33.3 millisecond", a second audio sample corresponding to the second video frame may also similarly have a presentation time of "66.6 milliseconds", and so on.

Block 310 may refer to an operation in which an audio time stamp corresponding to the presentation time calculated at block 605 is created. Such an operation may take any form, and the time stamp may be created using any suitable method. For example, the presentation time may be converted to a binary number of a predetermined number of bits, for example, 10 bits. The binary number may then be converted to a square wave waveform of a period equal to the number of bits multiplied by the expected period of one square wave. For example, if the period of a single square wave is 1 millisecond, the period of a square wave waveform of 10 bits in length will be 10 milliseconds.

Block 315 may refer to an operation in which the audio time stamp corresponding to the presentation time is injected into the audio sample. The audio time stamp may be injected into a channel corresponding to the right channel of audio. In an alternative example, the audio time stamp is injected into one of the channels of audio in a multiple channel audio surround sound signal. The audio time stamp may completely replace the normal audio sample associated with a video frame. In an alternative example, the audio time stamp may be combined with the normal audio sample at a frequency beyond that at which human hearing may detect such that the audio time code may not be heard by a human being. Such a technique may be typically known as digital watermarking.

Block 320 may refer to an operation in which a video time stamp corresponding to the presentation time calculated at block 305 is created. Such an operation may take any form, and the time stamp may be created using any suitable method. For example, the presentation time may be converted to a binary number of a predetermined number of bits, for example, 10 bits. The binary number may then be converted into a bar code. For example, a bar code may be created that includes 10 bars, with each bar representing one bit in the binary number. A narrow bar may indicate a binary value of zero and a wide bar may indicate a binary value of one. In an alternative example, the length of a bar may represent that binary value; for example, a short bar may represent the binary value zero and a long bar may represent the binary value of one. Such a bar code may be rendered as a computer graphic in-memory, and such a computer graphic may be encoded in any computer graphic format.

Additionally, the actual numerical representation of the presentation time may further be included with the time code. For example, if the calculated presentation time of a video frame is "1 millisecond", a video time stamp including the number "000.001 seconds" may be created. Such a numerical representation may also be rendered as a computer graphic in-memory, and such a computer graphic may be encoded in any computer graphic format. Finally, the video time stamp may further include both a bar code and a numerical time representation.

Block 325 may refer to an operation in which a first video time stamp is composited onto the top left hand corner of the video frame and a second video time stamp is composited onto the bottom right hand corner of the video frame. Such a compositing operation may be performed using any suitable operation. For example, the in-memory binary representation of graphics pixels associated with the video time stamp may replace a portion of the in-memory binary representation of graphics pixels associated with video frame.

In an alternative example, the first video time stamp and the second video time stamp are composited onto the video frame using typical video watermarking techniques such that the first video time stamp and the second video time stamp are not detectable by a human being. That is, while the information representing the first video time stamp and second video time stamp may be present in the visual data of the video frame, a human being may not detect that such information is present. The purpose of such a watermarking operation may be to include data in such a manner that it does not disrupt the viewing of the video by a human being.

Block 335 may refer to an operation in which an audio time code is injected into a second audio stream by a separate time code generator. Such an audio time code may be generated and injected using any conventional time code generating method, for example, using a conventionally constructed Society of Motion Picture Television Engineers (SMPTE) time code generator. The audio time code may be inserted in a channel of audio that is different than the channel of audio in which the time stamp was inserted at block 315. For example, the audio time code may be inserted in the channel of audio corresponding to the left channel of audio.

The audio time code may represent a concrete moment in time that is different than the presentation time calculated at block 305. Further, the audio time code may be injected into the second audio stream at any point after the audio time stamp was injected into the first audio stream at block 315.

Block 340 may refer to an operation in which a video time code is composited onto the video frame generated at block 320 by a separate time code generator. Such a video time code may be generated and injected using any conventional time code generating method, for example, using a conventionally constructed Society of Motion Picture Television Engineers (SMPTE) time code generator. The video time code may represent a concrete moment in time that is different than the presentation time calculated at block 305. Further, the video time code may be composited onto the video frame at any point after the video time stamp was composited onto the video frame at block 320.

Block 345 may refer to an operation in which the first and second audio streams and the video frame are captured and digitized by a multimedia capture system. Block 345 will be discussed in more detail in the discussion of FIG. 4.

Block 255 may refer to an operation in which an audio/video synchronization calculation method is performed on the captured audio and captured video received at block 345. Such an audio/video synchronization calculation method may include recognizing the audio time stamp, audio time code, video time stamps, and video time codes received on the first audio stream at block 345, second audio stream, and the video time stamps and video time code received on the video frame at block 345. Block 255 will be discussed in more detail in the discussion of FIG. 4.

Block 355 may refer to an operation in which the data recognized at block 350 is analyzed to discover if a video glitch may have occurred. Block 355 will be discussed in more detail in the discussion of FIG. 4.

Figure 4:
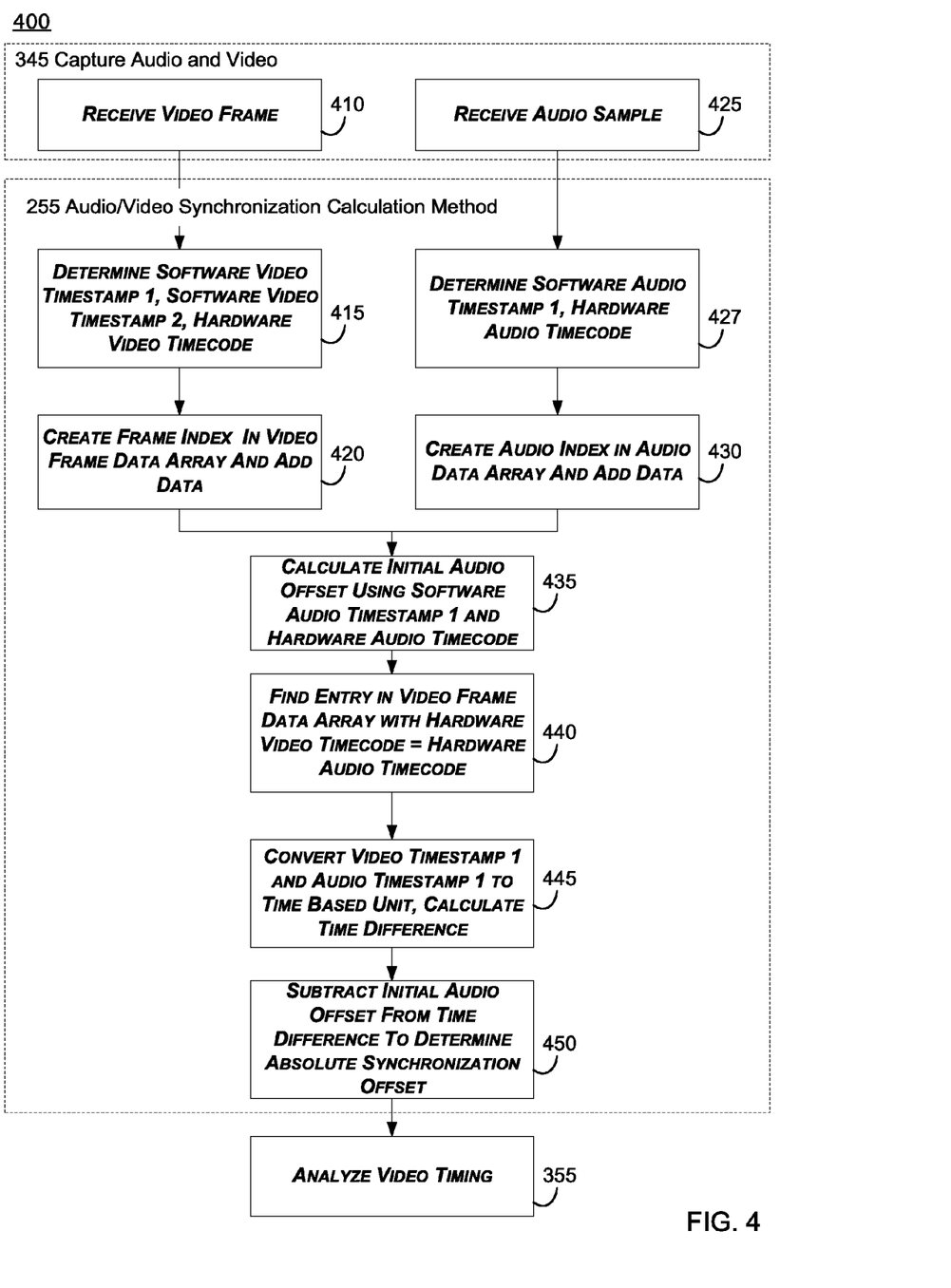
FIG. 4 is a flow diagram showing an example method for calculating the synchronization of a video frame and audio portion.

FIG. 4 is a flow diagram showing an example method 400 for calculating the synchronization of a video frame and audio portion. The method may generate a set of data representing the synchronization information related to a frame of video and a corresponding audio portion. This method may be implemented by the previously described audio/video synchronization analysis component 250 (of FIG. 2) or an equivalent component.

Block 410 may refer to an operation in which a video frame is received. Such a video frame may be an in-memory binary representation of a frame of video. In addition, such a video frame may be comprised of at least two interlaced fields of video. If a received frame of video is comprised of two interlaced fields of video, a received video frame may be comprised of a single field of the interlaced fields of video or may be comprised of a single video frame including both fields of video.

Block 415 may refer to an operation in which the first software video time stamp, the second software video timestamp, and the hardware video time code are recognized on the video frame. Such an operation may be performed on the in-memory binary representation of the frame of video or any form of the video frame. Such an operation may be a typical optical character recognition operation by searching the area of the video frame expected to contain time stamp or time code information, a binary data decoding operation, or the like. The first time software video time stamp and the second software video time stamp may have been included into the video frame at a point closest to when the audio corresponding to the video frame was first processed such that a corresponding audio time stamp may indicate a synchronization between the first software time stamp, the second software time stamp, and any corresponding audio time stamp. The hardware video time code may have been included in the video frame at some point after the video frame was initially processed and may indicate a time at which the video frame was no longer being processed.

Block 420 may refer to an operation in which a data array including information about the video frame and any other related frames included in a series of video frames may be created if one does not exist. If a video frame array already exists, an entry is created for the video frame which may have been received at block 410. Once the entry has been created for the video frame which may have been received at block 410, data representing the first software video time stamp, the second software video time stamp, and the first hardware video time code are added to the entry.

Block 425 may refer to an operation in which an audio sample is received. Such an audio sample may be an in-memory binary representation of a portion of a streaming audio signal. Such a streaming audio signal may be a "frame" of audio, or a portion of audio of a specific time length or period.

Block 427 may refer to an operation in which the software audio time stamp and the hardware audio time code are recognized on the sample which may have been received at block 425. The audio sample received at block 425 may be a stereo signal, a surround sound signal, or the like. Such an operation may be performed on the in-memory binary representation of the audio sample or any form of the audio sample. Such an operation may be the conversion of a waveform included in the audio sample to a binary form. For example, the audio sample may contain a square wave waveform which may include binary data, and an operation to convert the square wave to binary data may be performed.

The software audio time stamp may have been included into the audio sample at a point closest to when the video corresponding to the audio frame was first processed such that a corresponding video time stamp may indicate synchronization between the audio time stamp and the video time stamp. In addition, the software audio time stamp may be included on a different audio channel within the audio sample than the audio time code. For example, the software time code may be included in the left channel of the audio sample and the hardware time code may be included in the right channel of the audio sample. The hardware audio time code may have been included in the audio sample at some point after the audio sample was initially processed and may indicate a time at which the audio sample was no longer being processed.

The audio sample received at block 425 may not include both a software audio time stamp and a hardware audio time code. The reason for this may be that the software audio time stamp and the hardware audio time code are out of phase due to a delay introduced before the hardware audio time code was included.

Block 430 may refer to an operation in which an array including information about the audio sample and any other related audio samples may be created if one does not exist. As previously discussed, the audio sample may contain one of a software audio time stamp, a hardware audio time code, both a software audio time stamp and a hardware audio time code, or no software audio time stamp or hardware audio time code.

If a software audio time stamp was discovered at block 427, data representing the software audio time stamp and identifying the data as a software audio time stamp may be added to the array. If a hardware audio time code was discovered at block 427, data representing the hardware audio time code and identifying the data as a hardware audio time code may be added to the array. In an alternative example, the data representing a software audio time code may be included in an array containing only software audio time codes and the data representing a hardware audio time code may be included in an array containing only hardware audio time codes.

In addition, any information related to aiding in discovery of an audio frame may be recorded. For example, any audio offset information previously discovered may be further included in the array.

Block 435 may refer to an operation in which the final audio offset of the audio time code calculated at block 430 relative to the audio time stamp calculated at block 430. Such an operation may be performed by searching selecting a software audio time stamp and searching for a closely matching hardware time code. Once a close match has been discovered, each of the software audio time stamp and the final audio offset of the audio received at block 425 may be calculated. For example, if the audio frame received at block 425 was determined to be the fourth received audio sample and the time period of an audio sample was previously determined to be one millisecond, the final audio offset will be four milliseconds. Therefore, because the software audio time stamp and the hardware audio time code have been determined to be a close match, the final audio offset of each may be determined to be four milliseconds.

Block 440 may refer to an operation in which the video array of block 320 is searched to find an entry where the hardware video time code is equal to the hardware audio time code that may have been discovered at block 427. Once a match has been discovered, flow continues to block 445. Note that if a match is not found, processing flow may terminate at this point.

Block 445 may refer to an operation in which the first software video time stamp of the video frame referenced by the hardware video time code that may have been found at block 440 is converted to a time-based value. Such a conversion to a time-based value may be performed by any method, for example, by multiplying the expected duration of a frame by the sequential number value of the first software time stamp. Next, the difference of the time-based value of the first software video time and the time-based value of the software audio time stamp is calculated.

Block 450 may refer to an operation in which the final audio offset as calculated at block 435 is subtracted from the difference calculated at block 445. The result of such an operation may yield the absolute audio/video synchronization offset at the point at which the video frame was received at block 410 and the audio sample with a matching software audio time stamp was received at block 425. The audio/video synchronization offset is recorded in an array which may include such audio/video synchronization offsets for a predetermined number of software time stamps.

Note that at this point in example processing, flow may return to either of block 410 and/or block 425 as additional video frames and audio samples are received. The number of entries in each of the arrays discussed with respect to FIG. 4 may be of any size, and may be varied to increase the performance of processing flow.

Block 355 (from FIG. 3) may refer to an operation in which the data stored in the arrays discussed with respect to FIG. 4 may be analyzed to determine if any video glitches occurred.

Note that at this point, it may be possible to pass any data back to video and audio processing such that audio and video processing may alter the audio/video synchronization of a video frame and audio sample to correct any detected video glitches. Examples of the types of data analysis 355 to discover video glitches follow.

Figure 5:
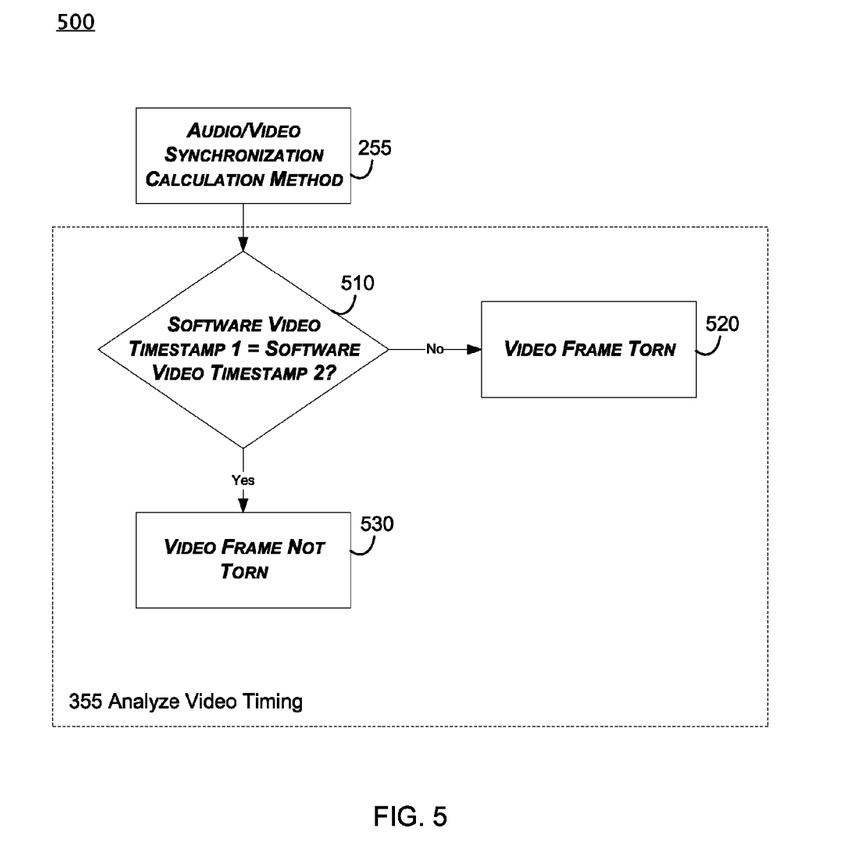
FIG. 5 is a flow diagram showing a first example method for analyzing the data in the example method for calculating the synchronization of a video frame and audio portion.

FIG. 5 is a flow diagram showing a first example method for analyzing the data in the example method for calculating the synchronization of a video frame and audio portion.

Block 255 may refer to an operation in which the example processing flow discussed in FIG. 3 and FIG. 4 is performed such a first software video time stamp and a second software video time stamp are discovered.

Block 510 may refer to an operation in which is determined if the first software video time stamp and the second software video stamp are equivalent. Such a determination may be performed using any operation suitable for establishing the equivalency of the first software video time stamp and the second software video time stamp. In response to a negative determination, flow continues to block 520. In response to a positive determination, flow continues to block 530.

Block 520 may represent a determination that the frame of video under examination includes the video glitch known as frame tearing in which one portion of first video frame and a second portion of a second video frame has been combined.

Block 530 may represent a determination that the frame of video under examination does not include the video glitch known as tearing.

Another example method of analyzing the data discovered with respect to block 255 (of FIG. 3 and FIG. 4) to discover video glitches follows.

Figure 6:
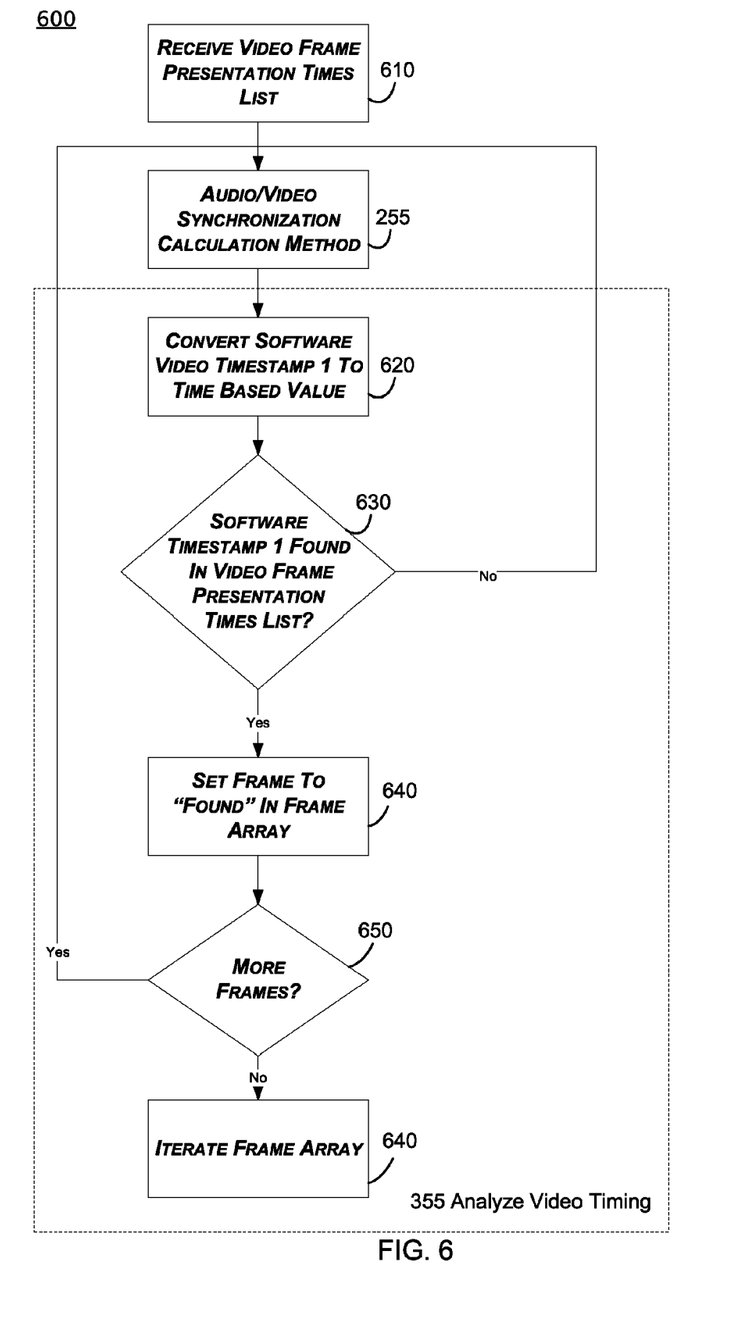
FIG. 6 is a flow diagram showing a second example method for analyzing the data in the example method for calculating the synchronization of a video frame and audio portion.

FIG. 6 is a flow diagram showing a second example method for analyzing the data in the example method for calculating the synchronization of a video frame and audio portion.

Block 610 may refer to an operation in which a list of presentation times corresponding to a predetermined number of video frames and audio samples may be received. Such a list may further include expected software time stamps and expected presentation time offset time-based values.

Block 255 may refer to an operation in which the example processing flow discussed in FIG. 3 and FIG. 4 is performed such a first software video time stamp and a second software video time stamp are discovered.

Block 620 may refer to an operation in which a software video time stamp is converted to a time-based value. Such a software video time stamp may have been discovered during the example processing flow of an example video frame received at block 255. Further, the time-based value may refer to the absolute presentation time the video frame was expected to be played back in a sequence of video frames under investigation.

Block 630 may refer to a determination in which the presentation list received at block 610 is searched for the time-based value associated with the video frame calculated at block 620. Such a determination may be performed using any suitable operation to search the presentation list for a matching time-based value. If the time-based value is found in the presentation list, a positive determination is the result. If the time-based value is not found in the presentation list, a negative determination is the result. In response to a negative determination, flow continues back to block 255 such that an additional or subsequent video frame may be analyzed. In response to a positive determination, flow continues to block 640.

Block 640 may refer to an operation in which the video frame array discussed in the description of FIG. 3 and FIG. 4 is searched for the matching entry representing the video frame currently under investigation. Once found, an additional portion of data is added to the entry. Such an additional portion of data may represent that the video frame under investigation was "found" in the presentation time list received at block 610.

Block 650 may refer to an operation to determine whether there may be additional video frames to process. In response to a positive determination, flow continues on to block 255 such that additional or subsequent video frames may be investigated. In response to a negative determination, flow continues to block 640.

Block 640 may refer to an operation in which the video frame array discussed in the description of FIG. 3 and FIG. 4 is iterated. In such an iteration, each entry in the array may be accessed and examined to determine if a portion of data representing that the corresponding video frame was "found" in the presentation time list is present in the entry. Video frames which do not contain a portion of data representing that the video frame was "found" in the presentation time list may have been "dropped" or not presented at all.

Another example method of analyzing the data discovered with respect to block 255 (of FIG. 3 and FIG. 4) to discover video glitches follows.

Figure 7:
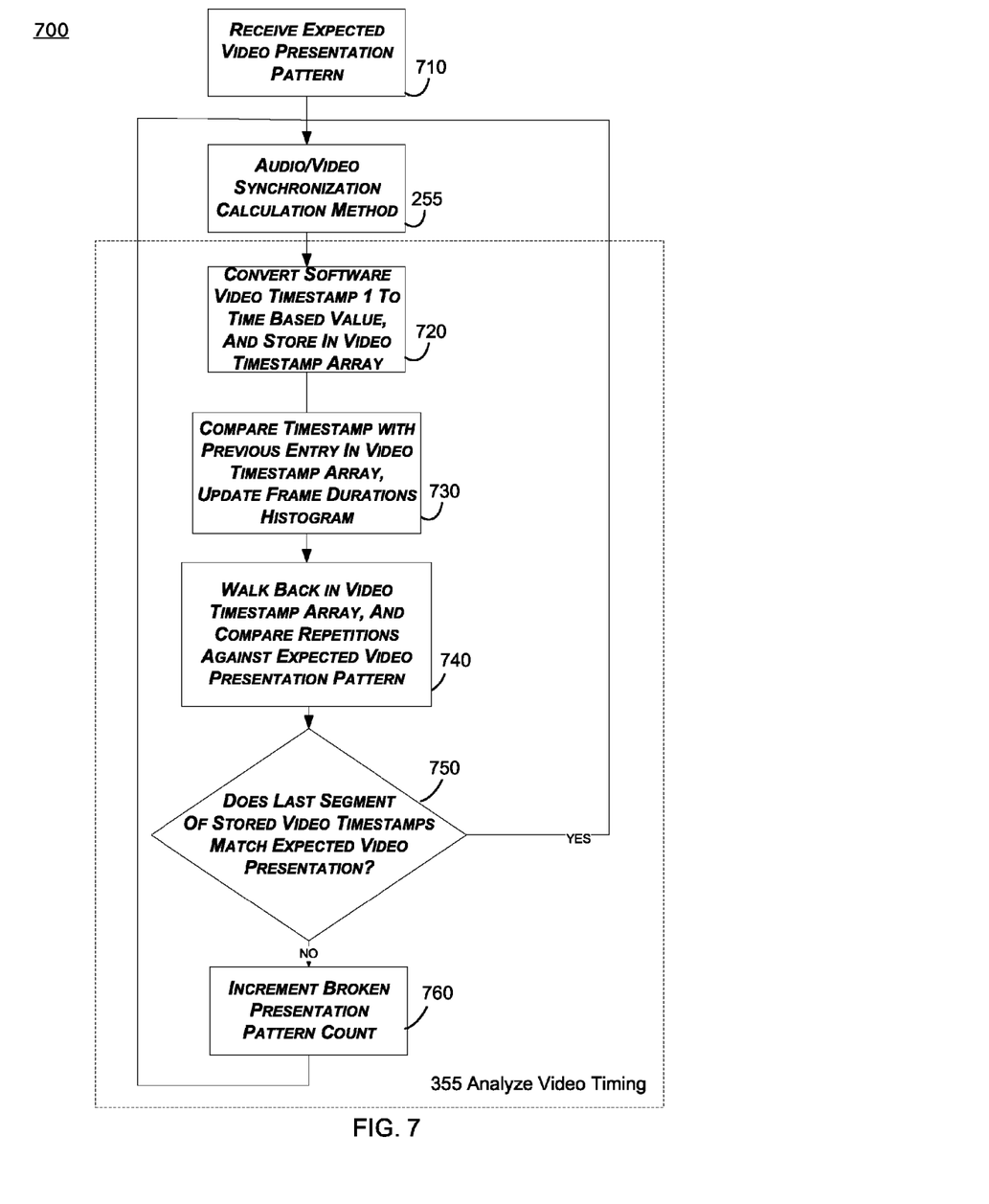
FIG. 7 is a flow diagram showing a third example method for analyzing the data in the example method for calculating the synchronization of a video frame and audio portion.

FIG. 7 is a flow diagram showing a third example method for analyzing the data in the example method for calculating the synchronization of a video frame and audio portion.

Block 710 may refer to an operation in which an expected video presentation pattern is received. Such an expected video presentation pattern may be related to a video frame rate conversion between the original source of the video and the display device of the video. For example, the frame rate of the original source of the video may be 24 frame per second film while the refresh rate of a computer monitor or television may be 60 Hz (Hertz, or cycles per second). As the display refresh of the original video capture medium and the display are not exact multiples of one another, a frame rate conversion must be performed. For example, a typical frame rate conversion may be a 3:2 video pull down.

In such a 3:2 video pull down, a first video frame may be displayed for 3 cycles or refreshes, a second video frame may be displayed for 2 cycles or refreshes, a third video frame may be displayed for 3 cycles or refreshes, a fourth video frame may be displayed for 2 cycles or refreshes, and so on. For example, if the first video frame is represented by the letter "A", the second video frame is represented by the letter "B", and so on; the expected video presentation pattern of the video may be AAABBCCCDD. However, any such video presentation pattern may be received.

Block 255 may refer to an operation in which the example processing flow discussed in FIG. 3 and FIG. 4 is performed such a first software video time stamp and a second software video time stamp are discovered.

Block 720 may refer to an operation in which a software video time stamp is converted to a time-based value. Such a software video time stamp may have been discovered during the example processing flow of an example video frame received at block 255. Further, the time-based value may refer to the absolute presentation time the video frame was expected to be played back in a sequence of video frames under investigation.

Block 730 may refer to an operation in which the time-based value of the video time stamp of block 720 is compared with other time-based values that may be stored in an array of such time-based values. Such an array of time-based values may include the time-based values of video frames previously processed. In addition, a histogram including display duration of each video frame processed may be updated.

Block 740 may refer to an operation in which the array of time-based values is iterated and the repetitions of the time-based values of each processed video frame are compared to the expected video presentation pattern received at block 720.

Block 750 may refer to a decision in which the last group of time-based values is compared to the expected presentation pattern received at block 710. For example, the expected presentation pattern may be to display a first frame for 3 refresh cycles and display a second frame for 2 refresh cycles. If the time-based value discovered at block 720 was expected to be in a group of 3 refresh cycles but only two entries corresponding to the time-based value were located in the array, such a time-based value may be a video frame display duration error. Therefore, in response to a negative determination, flow continues on to block 760. In response to a positive determination, for example, the time-based value was expected to be in a group of 3 and may have been found to be in a group of 3, flow continues to block 255.

Block 760 may refer to an operation in which a counter representing the pattern presentation errors is incremented.

Such example data analysis processes are only examples of the types of video glitches that may be discovered. Many other types of video glitches may be detected using the video time code, audio time stamp, and audio time code information discovered. In order to fully understand the process by which software time stamps may be added to an example video frame and example audio sample follow.

An example video frame including a first video time stamp and a second video time stamp may be helpful in visualizing the expected result of block 325 (of FIG. 3).

Figure 8:
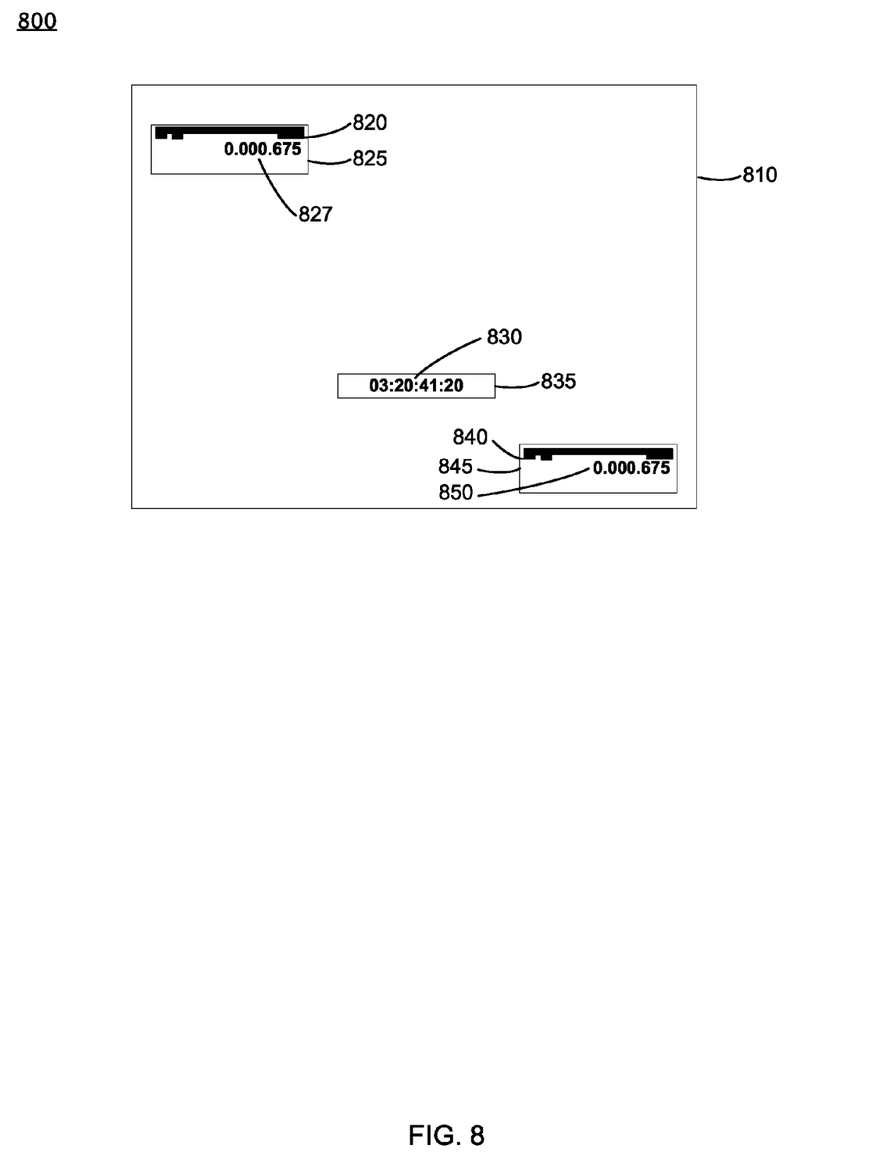
FIG. 8 is an example of a video frame produced by an example video time stamp method.

FIG. 8 is an example video frame 810 including a first software video time stamp 825, a second software video time stamp 845, and a hardware time code 835.

The first software video time stamp 825 may further include a bar code 820 representing the corresponding presentation time 827 of the video frame. Similarly, the second software video time stamp 845 may further include a bar code 840 representing the corresponding presentation time 850 of the video frame. The bar code 820 and the bar code 840 may have been created as discussed in the description of block 325 from FIG. 3.

Note that the first software video time stamp 825 and the second software video time stamp 845 may have been composited onto the example video frame 810 using a watermarking process and may not be detectable by a human being. That is, while the information representing the first software video time stamp 825 and the second software video time stamp 845 may be present in the visual data of the example video frame 810, a human being may not detect that such information is present. The purpose of such a watermarking operation may be to include data in such a manner that it does not disrupt the viewing of the video by a human being.

The hardware time code 835 may further include a time code 830. Such a time code 830 may be a Society of Motion Picture Television Engineers (SMPTE) time code, or the like. Such a time code may actually be contained in a vertical blanking area of the video signal, however, for the purposes of illustration may be shown as it may be visible by a device which may contain functionality to render such an SMPTE time code. Similarly to the first software video time stamp 825 and the second software video time stamp 845, the hardware time code 835 may be encoded as an SMPTE video time code in active lines of vertical blanking area, such as video line 22 or 23.

An automated system and method for detecting video glitches is disclosed. Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or may distributively process by executing some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The invention claimed is:

1. A method, comprising:
adding, by a computing device, a first time stamp to a first area of a video frame, to a second area of the video frame, and to a first portion of an audio signal corresponding to the video frame;
adding, by the computing device, a first time code to a third area of the video frame and to a second portion of the audio signal;
recognizing, by the computing device, the first time stamp and the first time code;
creating, by the computing device, a data array that includes information about the video frame and any other related frames included in a series of video frames;
adding, by the computing device, the first time stamp and the first time code into an entry of the data array; and
searching, by the computing device, the data array to find an entry where the first time stamp is equal to the first time code.

2. The method of claim 1, further comprising determining a time-based offset using the first time stamp and the first time code.

3. The method of claim 1, wherein the first time stamp includes a bar code representing a time value.

4. The method of claim 1, wherein the first time stamp includes a bar code representing a time value.

5. The method of claim 1, wherein the adding a first time stamp is performed before the video frame is converted to an analog form.

6. The method of claim 1, wherein the adding a first time stamp is performed before the audio signal is converted to an analog form.

7. The method of claim 1, wherein the first time code is added after the video frame has been converted to an analog form.

8. The method of claim 1, wherein the first time code is added after the audio frame has been converted to an analog form.

9. The method of claim 1, wherein the recognizing is performed by an optical character recognition.

10. The method of claim 1, wherein the first area and second area of the video frame are non-visible.

11. The method of claim 1, wherein the first portion of the audio signal is represented with an audio signal encoding scheme which is not perceivable by human beings.

12. The method of claim 1, further comprising analyzing at least one difference between the first time stamp and first time code in a different entry of the data array.

13. A system, comprising:
a video rendering component for rendering a first time stamp to a first area and to a second area of a frame of video;

an audio rendering component for rendering the first time stamp to a first portion of audio information corresponding to the frame of video;

a time code generator for adding a first time code to a third area of the frame of video and to a second portion of the audio information;

an analysis component for:
  determining the first time stamp and the first time code;
  converting the first time stamp to a time-based value based at least in part on an expected duration of time that the frame of video is to be displayed and a sequential number value of the first time stamp; and
  calculating a difference of the time-based value and a second time-based value associated with the audio information.

14. The system of claim 13, wherein the first time stamp is added to the first area and the second area of the frame of video before the frame of video is received by the system.

15. The system of claim 13, wherein the first time stamp was added to the first portion of audio information corresponding to the frame of video before the first portion of audio is received by the system.

16. The system of claim 13, wherein the first area is left of a vertical center point of the frame of video and is above a horizontal center point of the frame of video.

17. The system of claim 13, wherein the second area is right of a vertical center point of the frame of video and is below a horizontal center point of the frame of video.

18. A frame of video, comprising:
a first time stamp corresponding to a presentation time of the frame of video and corresponding to a first area and a second area of the frame of video, the first time stamp being rendered to a first portion of audio information corresponding to the frame of video;

a second time stamp corresponding to the presentation time of the frame of video; and a first time code corresponding to a display time of the frame of video, the first time code being added to a third area of the frame of video and to a second portion of the audio information, wherein the first time stamp is converted to a time-based value based at least in part on an expected duration of time that the frame of video is to be displayed and a sequential number value of the first time stamp, a difference of the time-based value and a second time-based value associated with the audio information being calculated.

19. The frame of video of claim 18, wherein the first time stamp is an undetectable watermark and the second time stamp is an undetectable watermark.

20. The frame of video of claim 18, wherein the first time code is a Society of Motion Picture Television Engineers (SMPTE) signal.

* * * * *